United States Patent [19]
Ross et al.

[11] Patent Number: 5,255,119
[45] Date of Patent: Oct. 19, 1993

[54] REFLECTIVE MAGNETO-OPTIC DEVICE WITH AN EMBEDDED CONDUCTOR CHANNEL

[75] Inventors: William E. Ross, Woodland Hills, Calif.; David N. Lambeth, Webster, N.Y.

[73] Assignee: Litton Systems, Inc., Beverly Hills, Calif.

[21] Appl. No.: 867,422

[22] Filed: Apr. 13, 1992

[51] Int. Cl.$^5$ .............................................. G02F 1/09
[52] U.S. Cl. ................................ 359/280; 359/282; 359/284
[58] Field of Search ............... 359/280, 281, 282, 283, 359/284, 107

[56] References Cited

U.S. PATENT DOCUMENTS

| | | | |
|---|---|---|---|
| 4,114,191 | 9/1978 | Lund | 359/107 |
| 4,476,465 | 10/1984 | Anderson | 359/282 |
| 4,495,492 | 1/1985 | Anderson et al. | 359/282 |
| 4,497,545 | 2/1985 | Ross | 359/282 |
| 4,500,176 | 2/1985 | MacNeal | 359/282 |
| 4,500,177 | 2/1985 | MacNeal | 359/282 |
| 4,550,983 | 11/1985 | Ross . | |
| 4,563,236 | 1/1986 | Ross et al. . | |
| 4,575,722 | 3/1986 | Anderson | 359/282 |
| 4,578,321 | 3/1986 | Ross et al. . | |
| 4,578,651 | 3/1986 | Heitmann et al. . | |
| 4,661,809 | 4/1987 | Anderson et al. | 359/282 |

FOREIGN PATENT DOCUMENTS 1180334 2/1970 United Kingdom .

OTHER PUBLICATIONS

Hill et al, "Fast Switchable Magneto-Optic Memory--Display Components," *Philips Journal of Research*, vol. 33, Nos. 5/6, 1978, pp. 211-225.

*Primary Examiner*—Martin Lerner
*Attorney, Agent, or Firm*—Donald J. Ellingsberg

[57] ABSTRACT

A reflective mode, magneto-optic spatial light modulator (MOSLM) device has planar electrical conductors which function both as optical mirror surfaces and as the address conductors for random access, selective switching of an associated individual pixel element which is formed from a magneto-optic material that exhibits magnetic domain characteristics, and further has a crossover portion of one of the reflective electrical conductors embedded in the magneto-optic device material at a nucleation region formed in the device material.

14 Claims, 6 Drawing Sheets

Fig. 1

(PRIOR ART)

REFLECTIVE MAGNETO-OPTIC DEVICE WITH AN EMBEDDED CONDUCTOR CHANNEL

CROSS-REFERENCE TO RELATED APPLICATION

Ser. No. 07/867,423, filed Apr. 13, 1992 even date herewith, and titled "Magneto-optic Device with Reflective Conductor" by William E. Ross, and assigned to the same assignee as the present invention.

COPYRIGHT MATERIAL

The description of the invention contains material which may be the subject of copyright protection. Reproduction of the patent document as it appears in the United States Patent and Trademark Office is permitted in furtherance of the United States Patent Laws (Title 35 United States Code). The copyright owner of this material reserves all other rights under the United States Copyright Laws (Title 17 United States Code).

BACKGROUND OF THE INVENTION

1. Field of the Invention

A reflective mode, magneto-optic spatial light modulator (MOSLM) device has planar electrical conductors which function both as optical mirror surfaces and as the address conductors for random access, selective switching of an associated individual pixel element which is formed from a magneto-optic material that exhibits magnetic domain characteristics.

2. Description of Related Art

In the field of magneto-optic devices, materials that exhibit magnetic domain characteristics, the behavior of such magnetic domains, and the use of these magnetic domain materials in sensing and display devices have been described: see U.S. Pat. Nos. 4,563,236; 4,578,321; and, 4,550,983; all assigned to the same assignee as this invention.

Figure 1:
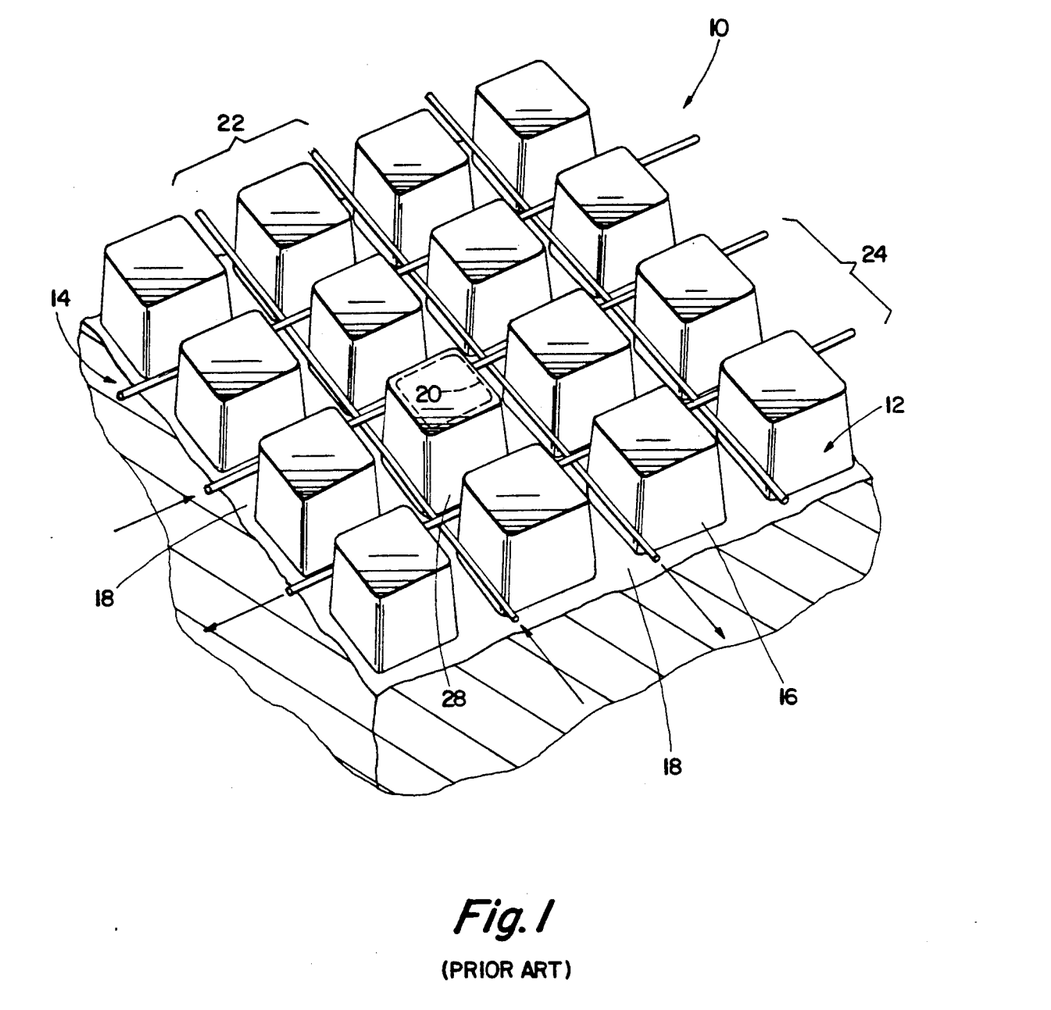
FIG. 1 is an enlarged perspective view of a PRIOR ART form of magnetic domain device.

A PRIOR ART form of magnetic domain lens known as the Litton Iron Garnet H Triggered Magneto-optic Device (LIGHT-MOD) 10 is shown by FIG. 1. The LIGHT-MOD TM lens 10 has a film layer 12 and a film layer support or substrate material 14. The film layer 12 is a relatively thin layer of magneto-optic material selected to exhibit desired magnetic domain characteristics. Such magneto-optic material can be a ferrimagnetic garnet composition; for example, a bismuth substituted iron garnet. The film support material of substrate 14 can be relatively thick compared to the film layer 12, and is selected to exhibit nonmagnetic and optically transparent characteristics. The material of substrate 14 can have the same single crystal structure as the magneto-optic material of film layer 12. For example, the film support material of substrate 14 can be garnet substrate such as gadolinium gallium garnet (GGG).

The film layer 12 of the PRIOR ART LIGHT-MOD lens 10 has a plurality of geometric elements or "pixels" 16 separated by grooves 18 in a row-and-column orientation as shown by FIG. 1. The geometric elements 16 can be formed by ion beam etching the grooves 18 into the film layer material 12. It is contemplated that the grooves 18 can also be formed using a wet chemical etch process. Each of the geometric elements or pixels 16, are formed from a volume of magneto-optic material sufficient to constrain a single, intrinsic magnetic domain that is bistable, i.e. magnetically reversible. One such magnetic domain physically constrained by a geometric element is schematically represented at 20 by FIG. 1 where the "easy axis" of the magnetic domain 20 is perpendicular to the perspective plane of the drawing.

The LIGHT-MOD lens 10 is a passive device; that is, it requires an external source of illumination. Its operation is non-volatile. Once written, a pattern will remain on the device until it is erased or changed. It is not affected by Earth's magnetic field or normal fields from electric equipment.

The LIGHT-MOD lens 10 operates on the principle of optical Faraday rotation. In one LIGHT-MOD lens, plane polarized light is passed through the magnetized film and its plane of polarization rotated clockwise by positive magnetic polarity, and counterclockwise by negative magnetic polarity. Thus, the magnetic state of the individual magnetic film pixel 16 affects the orientation of the plane of polarization of the light that passes through it.

The PRIOR ART LIGHT-MOD lens 10 as shown by FIG. 1 has a plurality of row and column conductor loops, similar to conductor loops 22 and 24, positioned to act upon each of the geometric elements 16. The row and column conductor loops 22 and 24 are positioned in the grooves 18 between adjacent pixels 16. (For another example of LIGHT-MOD lens, see U.S. Pat. No. 4,550,983 granted Nov. 5, 1985 for MAGNETO-OPTIC DEVICE FOR THE CONTROL OF ELECTROMAGNETIC RADIATION by William E. Ross and assigned to the same assignee.)

The matrix of row and column conductors 22 and 24, as shown by FIG. 1, permit the application of a magnetic field to a selected pixel element or elements by coincident current select; here selected pixel element 28.

An electric current passes through each of the selected conductor loops 22 and 24 in the directions indicated by the arrows. If the magnetic field produced at selected geometric element 28 is the same magnetic polarity as the magnetic domain 20, there is no magnetic reversal of the magnetic orientation of the magnetic domain. Where the magnetic field produced at the selected geometric element 28 is of opposite magnetic polarity to that of the magnetic domain, there is a magnetic reversal of the magnetic domain 20; in essence, magnetic domain reversal at the coincidence of conductor loops 22 and 24. This reversal or switching from one state to the other by coincident current pulses is an addressing technique similar to that used for magnetic core memories. Current pulses as short as 10 nanoseconds and of a peak amplitude of 150 ma can be used. A bias coil surrounding the array can also be used since this aids the switching process completing the magnetic domain reversal to saturation after initiation of the switching action by the conductors. It may also be used for "bulk" erase.

The related application cited above teaches a reflective mode, magneto-optic spatial light modulator (MOSLM TM) device having a plurality of individual pixel elements formed from a magneto-optic material and supported by a non magnetic substrate. Both the pixel elements and the substrate are optically transparent to incident electromagnetic radiation, such as light, that passes at least through a selected pixel and is reflected back through the pixel by the planar surface of at least one electrical conductor which is positioned relative to the pixel. The electrical conductor can be one of a respective pair of coincident current select conductors positioned to accomplish a desired complete or partial reversal of the direction of magnetization of the magnetic domain which is physically constrained by the pixel.

Magneto-optic devices, including the reflective MOSLM device of the related application, require a relatively large drive current to complete a desired change in the direction of magnetization in the magnetic domain, and have a separate yet complementary requirement to reduce the magnetic domain switching time.

OBJECTS OF THE INVENTION

Accordingly, it is an object of the invention to provide a new and improved reflective magneto-optic spatial light modulator (MOSLM) device.

It is an object of the invention to provide a new and improved MOSLM device that operates in the reflective mode utilizing the Faraday effect.

It is an object of the invention to provide a MOSLM device having an increased magneto-optic effect with reduced drive currents for magnetic domain reversal.

It is an object of the invention to provide a MOSLM device having an increased magnetic field adjacent to a nucleation site for initiating magnetic domain reversal.

It is an object of the invention to provide a reflective MOSLM device that requires a reduced drive current to complete the desired change in the direction of magnetization of a magnetic domain constrained within a pixel element formed from a magneto-optic material.

It is an object of the invention to provide a reflective MOSLM device that has a nucleate generator region located at a nucleation point within the magneto-optic material of a pixel element.

It is an object of the invention to provide a reflective MOSLM device that has a nucleate generator region of an electrical conductor embedded within a nucleation region of the magneto-optic material which forms a pixel element.

It is an object of the invention to provide a reflective MOSLM device that requires a reduced nucleation drive current.

It is an object of the invention to provide a MOSLM device having reduced magneto-optic material film thickness with a corresponding reduction in switching time for magnetic domain reversal, and no decrease in device efficiency.

It is an object of the invention to provide a MOSLM device having reduced magneto-optic material film thickness permitting reduced pixel size with smaller gaps therebetween which results in higher resolution.

It is an object of the invention to provide a new and improved reflective MOSLM device having increased resolution.

SUMMARY OF THE INVENTION

Briefly, in accordance with one form of the invention, a reflective mode, magneto-optic spatial light modulator (MOSLM) device has a crossover portion of a reflective electrical conductor embedded in the magneto-optic device material at a nucleation region formed in the device material.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing(s).

DESCRIPTION OF THE INVENTION

Figure 2:
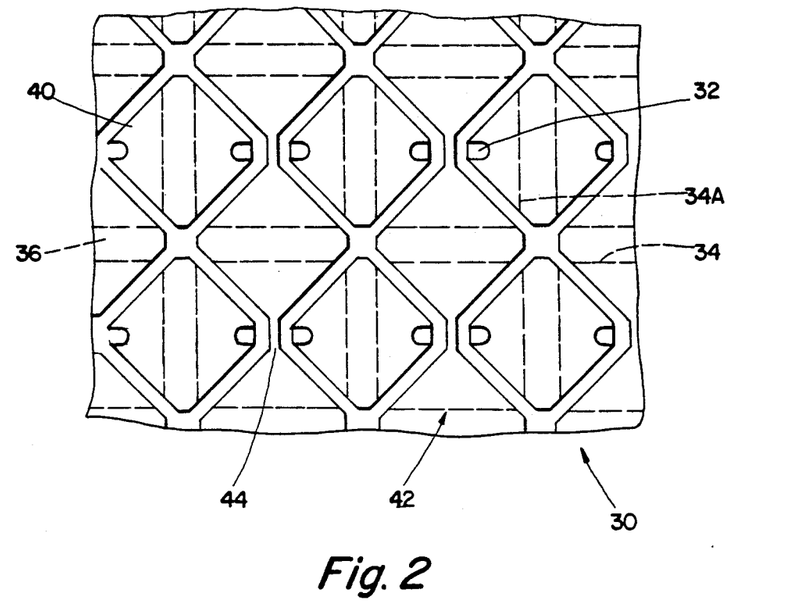
FIG. 2 is a plan view of a portion of one form of magneto-optic spatial light modulator (MOSLM) device of the invention.
Figure 3:
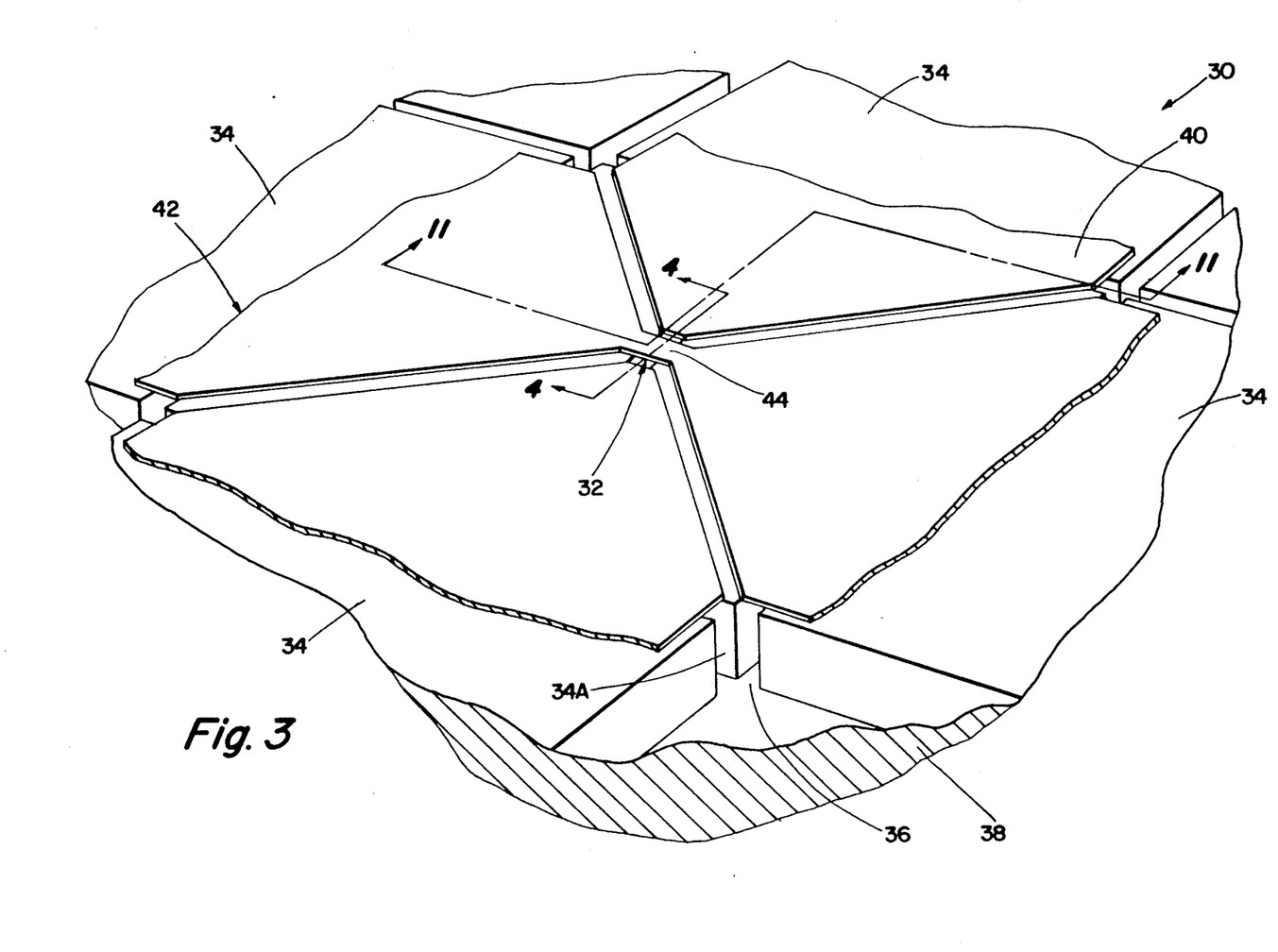
FIG. 3 is an enlarged perspective view of one pixel element of the MOSLM device of FIG. 2.

One form of reflective, magneto-optic spatial light modulator (MOSLM) device 30 of the invention having an embedded conductor channel 32 is shown by FIGURES and 3. As in the PRIOR ART magnetic domain lens 10 of FIG. 1, MOSLM device 30 is formed with a plurality of similar pixel elements 34 (shown in phantom by FIG. 2) separated by similar grooves 36, and supported by a substrate 38 as shown by FIG. 3. Each of the pixel elements 34 is formed from a predetermined volume of magneto-optic material, as will be described, that is sufficient to constrain a single, intrinsic magnetic domain which is bistable; i.e., its direction of magnetic orientation is reversible. For a clear understanding of the invention, one such magnetic domain (not shown, but like magnetic domain 20 of FIG. 1 as has been described) is physically constrained by pixel element 34A of FIG. 3 (also shown in phantom by FIG. 2). Again, the easy axis of each magnetic domain is perpendicular to the plane of substrate 38, e.g., perpendicular to the perspective plane of FIG. 3.

Referring now particularly to FIG. 3, one pair of electrical conductors 40 and 42 are formed in accordance with the invention. Unlike the PRIOR ART electrical conductors 22 and 24 of FIG. 1, the electrical conductors 40 and 42 are not positioned, either partially or totally, within the grooves 36 formed between the pixel elements 34 as shown by FIG. 3. Rather, conductors 40 and 42 are preferably planar and positioned as shown by FIG. 2 to cover not only the pixel elements 34, but also the adjacent grooves 36; for example, groove 36 as shown by FIG. 3. However it is contemplated that the adjacent grooves need not be covered by the conductors.

Figure 4:
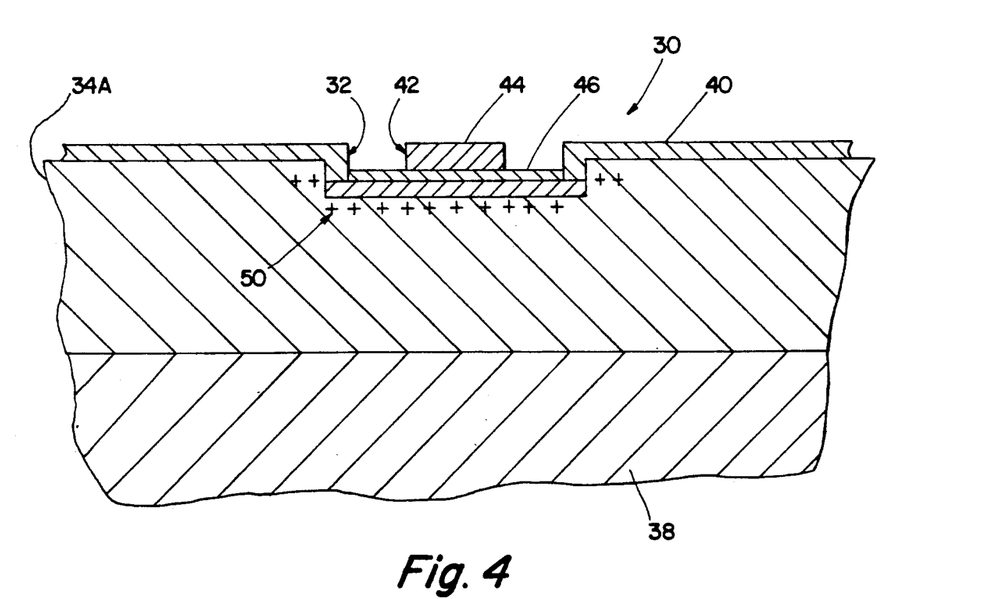
FIG. 4 is an enlarged, cross section of the MOSLM device of FIG. 3 along sectional line 4—4.

In FIGS. 3 and 4, the MOSLM device 30 has a first conductor 40 positioned orthogonally to a second conductor 42. Each of the conductors is formed with a distinctive necked down portion; the embedded conductor channel 32 of the first conductor 40, and the necked portion 44 of the second conductor 42 which cooperate to develop a crossover region. The necked portion 44 of the second conductor as a crossover portion overlays the embedded conductor channel 32, and each conductor is electrically insulated from the other by an electrical insulator layer 46 as shown by FIG. 4. One suitable material for forming the insulator layer 46 can be silicon dioxide ($SiO_2$). The conductors 40 and 42 are preferably formed from either gold or silver; however, it is contemplated that copper or aluminum could also be used.

The resulting configuration of the orthogonally positioned conductors 40 and 42 with the respective necked down portions 32 and 44 develop a "bow tie" pattern as can be seen in FIG. 2. This bow tie pattern is characteristic of the MOSLM device 30 of the present invention.

The MOSLM device 30, like other magneto-optic devices, is electrically addressable and changes or switches the direction of magnetization M of a magnetic material formed into individual pixel or post elements 34 through electrical conductors or drive lines 40 and 42 that establish a magnetic field having an opposite direction of magnetization. (Hill, B. And Schmidt, K. P., "Fast Switchable Magneto-Optic Memory Display Components", Phillips Journal of Research, Volume 33, Nos. 5/6, 1978, page 211; and U.S. Pat. No. 4,114,191). An external bias field may be required (U.S. Pat. No. 4,114,191) or it may be omitted (United Kingdom Patent No. 1,180,334).

When a magnetic field $H_{eff}$ is established and applied along the easy axis of the magneto-optic material, having a strength equal to or greater than $H_k - 4\pi Ms$, the reversal of the direction of magnetization or switching occurs.

This process of switching involves two parts: nucleation of a domain wall at the nucleation site and the movement or propagation of the domain wall toward or to complete saturation. This can be better understood by referring to FIGS. 5 and 6.

A magnetic domain wall is established by nucleation at a nucleation site within the magnetic material of the selected post element. This domain wall is formed between the initial condition of magnetization and the nucleated opposite magnetic condition. The remainder of the element is switched by propagating the domain wall through the thickness of the pixel element so that part or all of the entire element exhibits a direction of magnetization opposite to the initial condition, i.e., partial or complete saturation.

Figure 5:
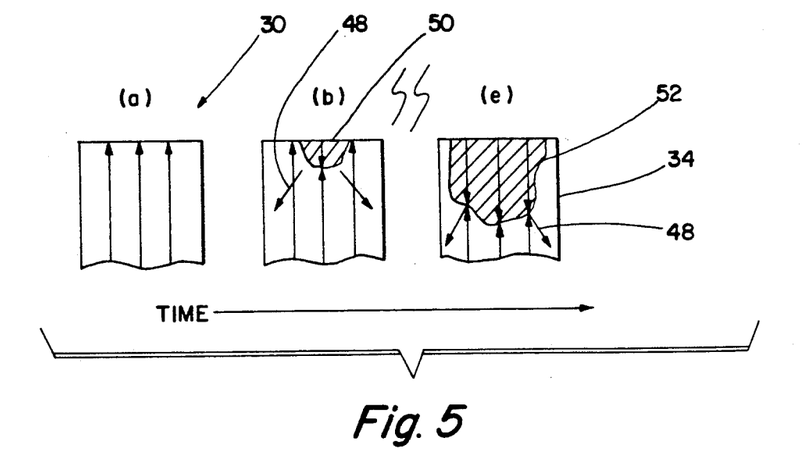
FIG. 5 is a partial elevation view in schematic sequence of the MOSLM device of FIG. 3 in an operative mode.
Figure 6:
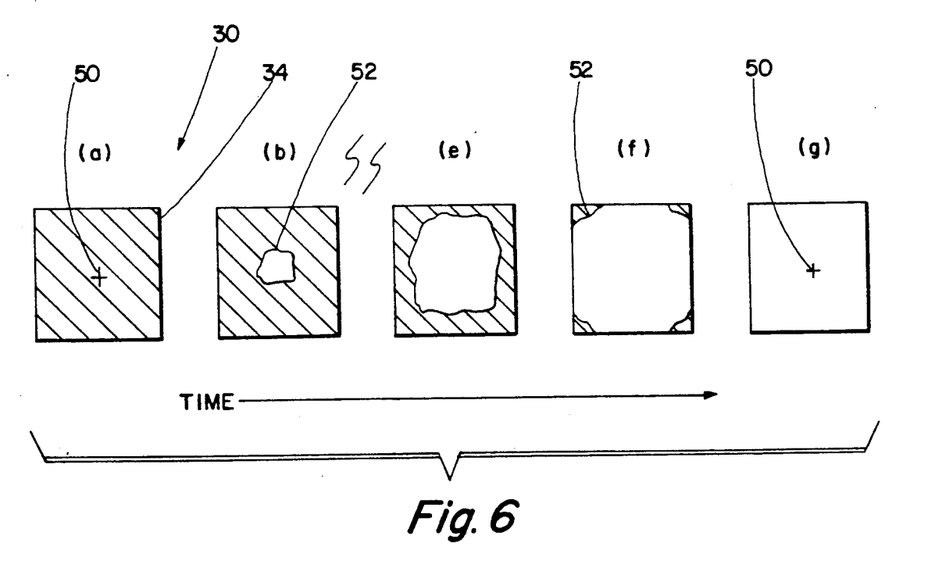
FIG. 6 is a plan view in schematic sequence of the MOSLM device of FIG. 5 in the operative mode.

The direction of magnetization in the magnetic domain device 30, when no external magnetic field is applied, is shown by FIGS. 5(a) and 6(a). For description purposes, the direction of magnetization is arbitrarily designated as "up", i.e. north polarity is away from the substrate. Upon the application of an external magnetic field designated by $H_{eff}$ arrow 48 in FIG. 5(b), nucleation of a magnetic domain reversal occurs generally at nucleation site 50. Nucleation that occurs at site 50 is evidenced by a reversal of the direction of magnetization of the film layer 34 so that the direction of magnetization within the nucleation site is "down", and is shaded in FIG. 5. The nucleation site 50 and the remainder of the film layer 34 in FIG. 5(b) thus represent volumes of film layer material having opposite directions, up and down, of magnetization. These volumes meet at a discernible boundary line or domain wall 52.

Continued application of the external magnetic field after nucleation, drives or moves the domain wall 52 through the film layer 34 of the magnetic domain device 30 so that the resulting volume material, which exhibits a "down" direction of magnetization, increases as the "up" volume decreases. This is schematically illustrated by FIG. 5(b), (e) and FIG. 6(b), (e), and (f). When the external bias magnetic field is greater than the saturation or collapse field, and is applied for a determinable period of time, the domain wall 52 will sweep entirely through the film layer 34 of the magnetic domain device 30 so that the direction of magnetization is reversed from the total "up" and unshaded direction of FIG. 5(a), or the shaded direction of FIG. 6(a), to the total "down" and here unshaded direction of FIG. 6(g).

If the external bias magnetic field is applied for a shorter period of time, then the result is a stripe domain condition, i.e directions of magnetization are both "up" and "down" in a pixel element. (See U.S. Pat. No. 4,495,492; assigned to the same assignee as this invention.)

The improved functions of the MOSLM device 30 of the invention can be better understood by a description of one method of forming the MOSLM device 30 which includes several process steps illustrated by FIGS. 7 through 11. The processes used in these steps are considered to be conventional and well-known.

Figure 7:
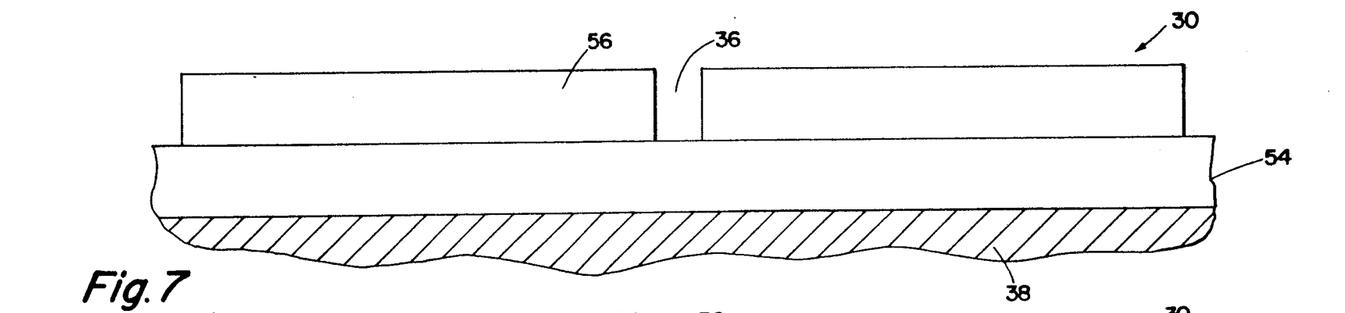
FIG. 7 is an enlarged, cross section of a process step to form the MOSLM device of the invention.
Figure 8:
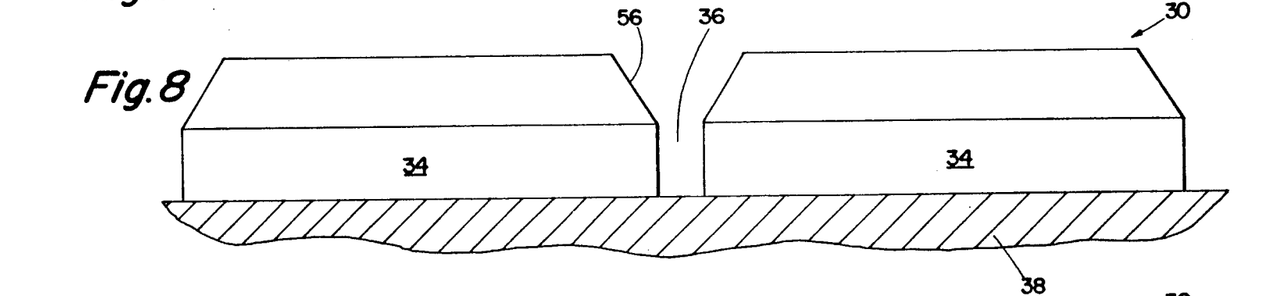
FIG. 8 is an enlarged, cross section of a process step subsequent to the step of FIG. 7.

In FIG. 7, a relatively thin film 54 of magneto-optic material is formed on substrate 38 by liquid phase epitaxial deposition. The film 54 can have a thickness of 3 μm, while the substrate 38 can be relatively thick, e.g., greater than 10 μm. A photo resist layer 56, which has been exposed to a pixel mask, developed and etched, then defines the pixel elements 34 that are formed in the film 54 of FIG. 7 and separated by the etched or ion milled grooves 36 as shown by FIG. 8.

Figure 9:
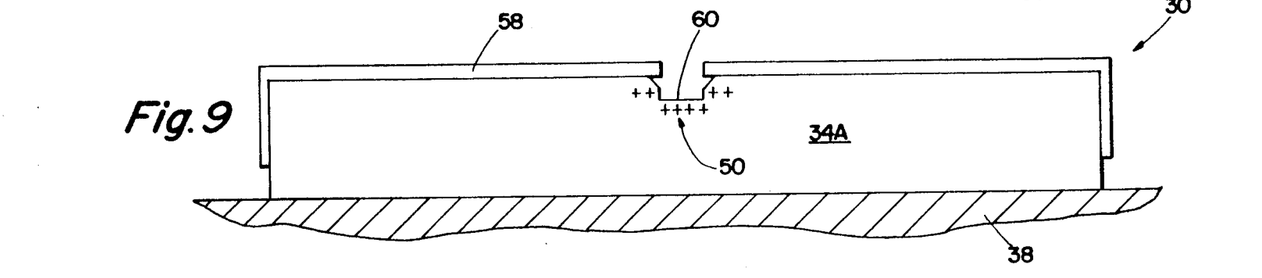
FIG. 9 is an enlarged, cross section of a process step subsequent to the step of FIG. 8.

In FIG. 9, an etch resist material such as silicon dioxide ($SiO_2$) layer 58 is deposited on individual pixel element 34A. A channel 60 for the embedded channel conductor portion 32 is formed in the magneto-optic material of pixel element 34A by a series of etching and mask steps. The magneto-optic material of channel 60 is ion implanted, either before or after formation of the channel, to create a nucleation site 50 which is located approximately in the center of the magneto-optic material of pixel 34A. In one embodiment of the MOSLM device 30, the channel 60 was carved into the magneto-optic material to a depth of about 4000 Ångstroms.

Figure 10:
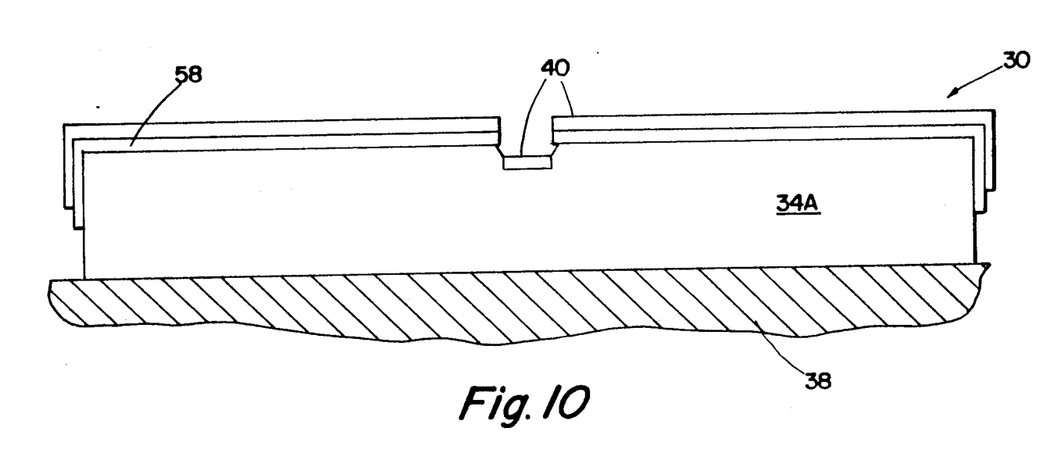
FIG. 10 is an enlarged, cross section of a process step subsequent to the step of FIG. 9.
Figure 11:
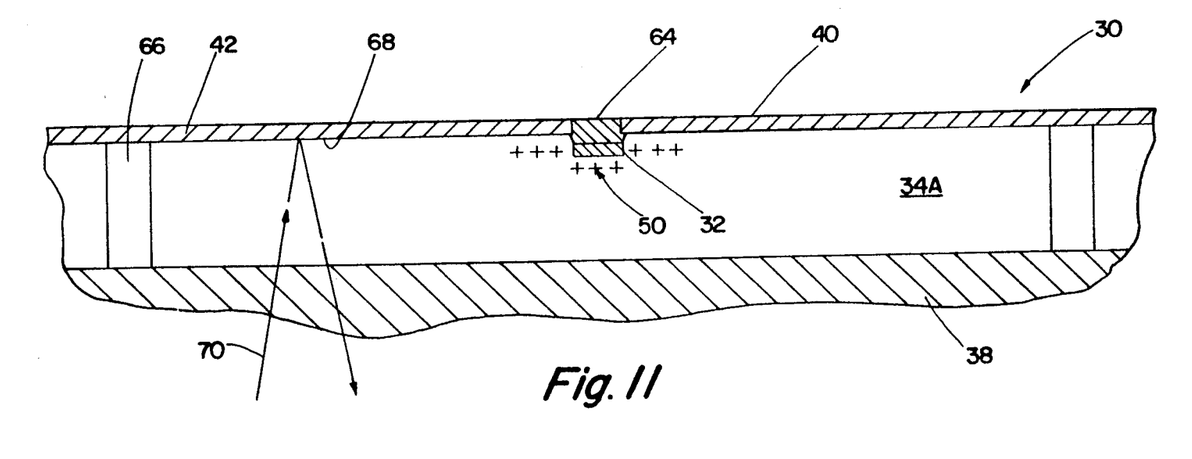
FIG. 11 is an enlarged, cross section of the MOSLM device of FIG. 3 along sectional line 11—11 as formed by the representative process steps of FIGS. 7 through 10, and in an operative mode.

Thereafter, the first conductor 40 is deposited on the $SiO_2$ layer 58 and in channel 60 on the magneto-optic material of pixel 34A as shown by FIG. 10. This 2000 Ångstroms. In a later process step, a pair of vias, such as via 64 as shown by FIG. 11, are formed by an appropriate sequence of etch and mask steps, and then the second conductor 42 is deposited along with the vias, e.g., via 64, which electrically interconnect the embedded channel portion 32 of conductor 40 deposited in the channel 60 to the planar portions of conductor 40; see also FIG. 3. Thus, the first conductor 40 with the embedded conductor channel 32, which is proximate to the nucleation site 50, in combination with necked portion 44 of the second conductor 42 function together as a magnetic field generator.

Lastly, in the MOSLM device 30 of the invention as shown by FIG. 11, the grooves 36 can be filled with a suitable opaque material 66.

Referring again to FIGS. 3 and 4, pixel element 34A constrains a single, intrinsic magnetic domain (not shown but like magnetic domain 20 of the PRIOR ART magnetic domain lens 10 of FIG. 1,) that is bistable, i.e. magnetically reversible. As taught by U.S. Pat. Nos. 4,550,983 and 4,578,321, electric drive currents supplied by coincident current select in conductors 40 and 42 will create an external magnetic field that is centered or focused at the crossover region with its embedded conductor channel 32. The embedded conductor 3 is proximate and within the nucleation site 50 which can also be referred to as a "magnetic domain nucleate generator region". This structural juxtaposition of the embedded conductor 32 within the nucleation site 50 significantly reduces the drive current requirements since in accordance with the teachings of electrophysics, a magnetic field increases as the distance from a nucleation site to its drive conductor(s) is reduced. With the MOSLM device 30, drive current can be two-to-ten times lower with correspondingly reduced current and power, and enhanced device speed.

The embedded conductor channel 32 further reduces the drive current since the location of the field required to move the domain wall 52 (see FIGS. 5 and 6) out of the implanted area into the bulk film is at the maximum field produced by the sum of the coincident current select channel conductor 40 and surface conductor 42.

The planar conductors, such as conductors 40 and 42, of MOSLM device 30 not only enable this coincident current select but one or both also develop a highly reflective mirror surface 68 directed toward an associated pixel element such as pixel 34A (see FIG. 11.) Incident radiation 70, for example, polarized light of an optical beam, passes through the magneto-optic material of pixel 34A and is reflected by surface 68 to pass for the second time through the material of pixel 34A. This reflective mode of operation doubles the magneto-optic effect of MOSLM device 30 when compared to known transmissive magnetic domain lens as represented by the PRIOR ART magnetic domain lens 10 of FIG. 1.

This structure of MOSLM device 30 enhances producibility by halving both film growth time an etching time since the reflective mode halves the film thickness required for an equivalent transmissive magneto-optic lens device; the film thickness is equivalent to the height of the pixel elements 34 formed on substrate 38 as shown by FIG. 3. Further, thinner film corresponds to narrower gaps, i.e., grooves 36, between pixels 34. It also reduces switching or transition time; the time required to complete the reversal of magnetic orientation of the magnetic domain within a selected pixel. The central location of a nucleation site 50 in pixel element 34A of FIGS. 4 and 11, further reduces magnetic domain transition time. This permits better photolithography for structuring the necked or reduced conductor portions at the nucleation site. Since the magnetic field is established by and adjacent to a conductor and is proportional to the drive current value, the correspondingly smaller conductors of the MOSLM device 30 of the invention require lower drive currents with lower electrical power dissipation.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

We claim:

1. A reflective magneto-optic spatial light modulator (MOSLM) device comprising:
   a) an optically transparent, nonmagnetic substrate;
   b) at least one pixel element formed from a magneto-optic material on said substrate, said pixel further having a physical configuration sized to constrain a single magnetic domain that exhibits a known magnetic characteristic which can be selectively reversed;
   c) a nucleation site formed in said pixel material;
   d) a channel conductor embedded in said nucleation site;
   e) a pair of electrical conductors positioned orthogonally on said said pixel outer surface;
   f) a cross-over region developed by said electrical conductors at said nucleation site;
   g) a selected one of said pair of conductors electrically interconnected to said channel conductor and electrically insulated from the remaining one of said pair of conductors; and
   h) at least one of said pair of electrical conductors having a generally planar surface that develops a mirror surface to reflect incident radiation through said pixel element SO THAT the reflected incident radiation exits through the pixel to complete two passes through the magneto-optic material.

2. The MOSLM device of claim 1 in which said pixel element has an exposed channel formed in the obverse surface of said pixel.

3. The MOSLM device of claim 2 in which said channel conductor is formed in said exposed channel with an exposed surface electrically insulated from the remaining one of said pair of conductors.

4. The MOSLM device of claim 3 in which via portions physically and electrically interconnect said channel conductor to said selected one of said pair of conductors.

5. The MOSLM device of claim 3 in which said exposed surface is electrically insulated only at said crossover region.

6. The MOSLM device of claim 1 in which the magneto-optic material has selected magnetic domain characteristics, and said nucleation site has altered magnetic characteristics to enhance nucleation and propagation of a magnetic domain reversal.

7. The MOSLM device of claim 6 in which said nucleation site is central to the physical volume of the pixel magneto-optic material.

8. The MOSLM device of claim 1 having a plurality of pixel elements identical to said pixel element physically separated by grooves to isolate and constrain a signal magnetic domain in each of said pixel elements.

9. The MOSLM device of claim 8 in which said grooves are filled with a nonmagnetic, opaque material.

10. A magneto-optic spatial light modulator (MOSLM) device having at least one pixel element formed form a magneto-optic material, which exhibits magnetic domain characteristics, and altered to develop a nucleation region, and further having a substrate that supports the pixel element formed from a nonmagnetic material where both the magneto-optic material and the nonmagnetic material are optically transparent CHARACTERIZED IN THAT a coincident current select means positioned to act upon the pixel element and a magnetic domain constrained within the material of the pixel element comprises:

a) at least a first pair of electrical conductors supported by the pixel element and electrically insulated from each other, b) an electrical channel conductor embedded in the pixel element, c) a selected one of said pair of conductors electrically connected to and through said channel conductor, d) said pair of conductors developing a magnetic field generator region proximate to the nucleation region in the pixel element, and e) at least one of said conductors having a generally planar configuration which develops a mirror surface to reflect incident radiation directed through at least the pixel element toward said mirror surface SO THAT the reflected radiation exits at least through the pixel element to complete two passes through the pixel magneto-optic material.

11. The MOSLM device of claim 10 in which each of said conductors has a planar configuration which develops said mirror surface for each conductor.

12. The MOSLM device of claim 10 in which said mirror surface is an optical mirror surface.

13. The MOSLM device of claim 10 in which said pair of electrical conductors are orthogonally positioned relative to each other.

14. The MOSLM device of claim 13 having a plurality of pixel elements identical to said pixel element orthogonally positioned in a row-and-column pattern, and with said electrical conductors similarly arranged SO THAT the MOSLM device has a bow-tie pattern in plan.

* * * * *